United States Patent
Mehta et al.

(10) Patent No.: US 7,697,623 B2
(45) Date of Patent: Apr. 13, 2010

(54) METHOD AND SYSTEM FOR SWITCHING ANTENNAS DURING TRANSMISSION TIME INTERVALS IN OFDMA SYSTEMS

(75) Inventors: Neelesh B. Mehta, Needham, MA (US); Erdem Bala, Cambridge, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 666 days.

(21) Appl. No.: 11/620,089

(22) Filed: Jan. 5, 2007

(65) Prior Publication Data

US 2008/0165879 A1   Jul. 10, 2008

(51) Int. Cl.
*H04L 27/28* (2006.01)
*H04B 17/00* (2006.01)

(52) U.S. Cl. .................... 375/260; 455/67.7

(58) Field of Classification Search ............... 375/267, 375/260, 341, 347; 455/67.7, 68, 101; 370/203, 370/208, 210
See application file for complete search history.

(56) References Cited

U.S. PATENT DOCUMENTS

| | | | |
|---|---|---|---|
| 7,039,370 B2 * | 5/2006 | Laroia et al. | 455/101 |
| 2006/0148408 A1 * | 7/2006 | Cho et al. | 455/67.7 |
| 2008/0084845 A1 * | 4/2008 | Kuchibhotla et al. | 370/331 |
| 2008/0101440 A1 * | 5/2008 | Lee | 375/141 |

* cited by examiner

*Primary Examiner*—Khai Tran
(74) *Attorney, Agent, or Firm*—Dirk Brinkman; Gene Vinokur

(57) ABSTRACT

A method and system switches antennas in an orthogonal frequency division multiplexed access (OFDMA) wireless communication system while transmitting symbols. Each symbol includes a cyclic prefix and a block of data signals. The symbols are transmitted during a first portion of a transmission time interval (TTI), from a first antenna. Then, the RF chain is switched to a second antenna to transmit the symbols, and in which the switching is performed substantially between transmitting two consecutive transmitted symbols.

10 Claims, 7 Drawing Sheets

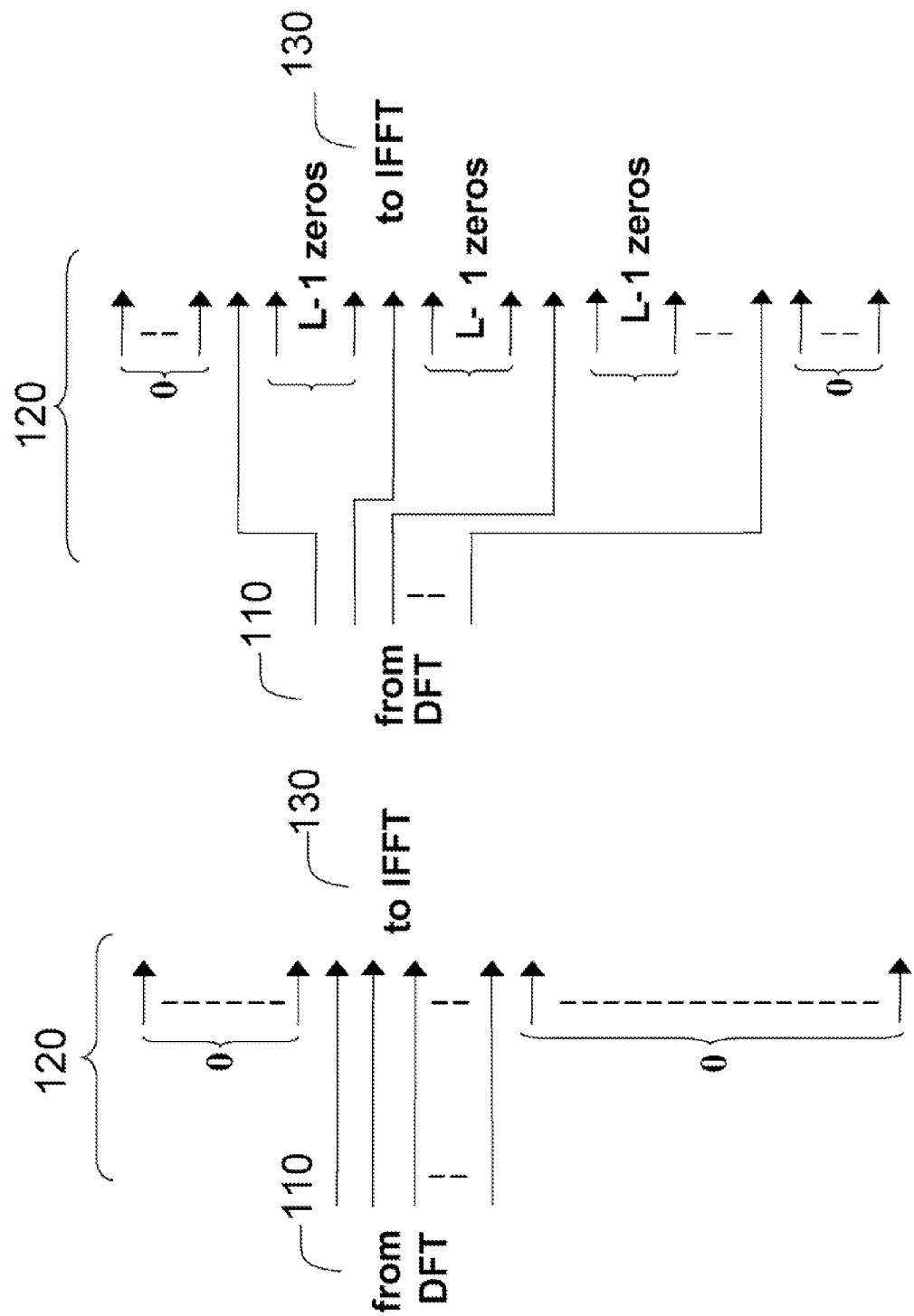

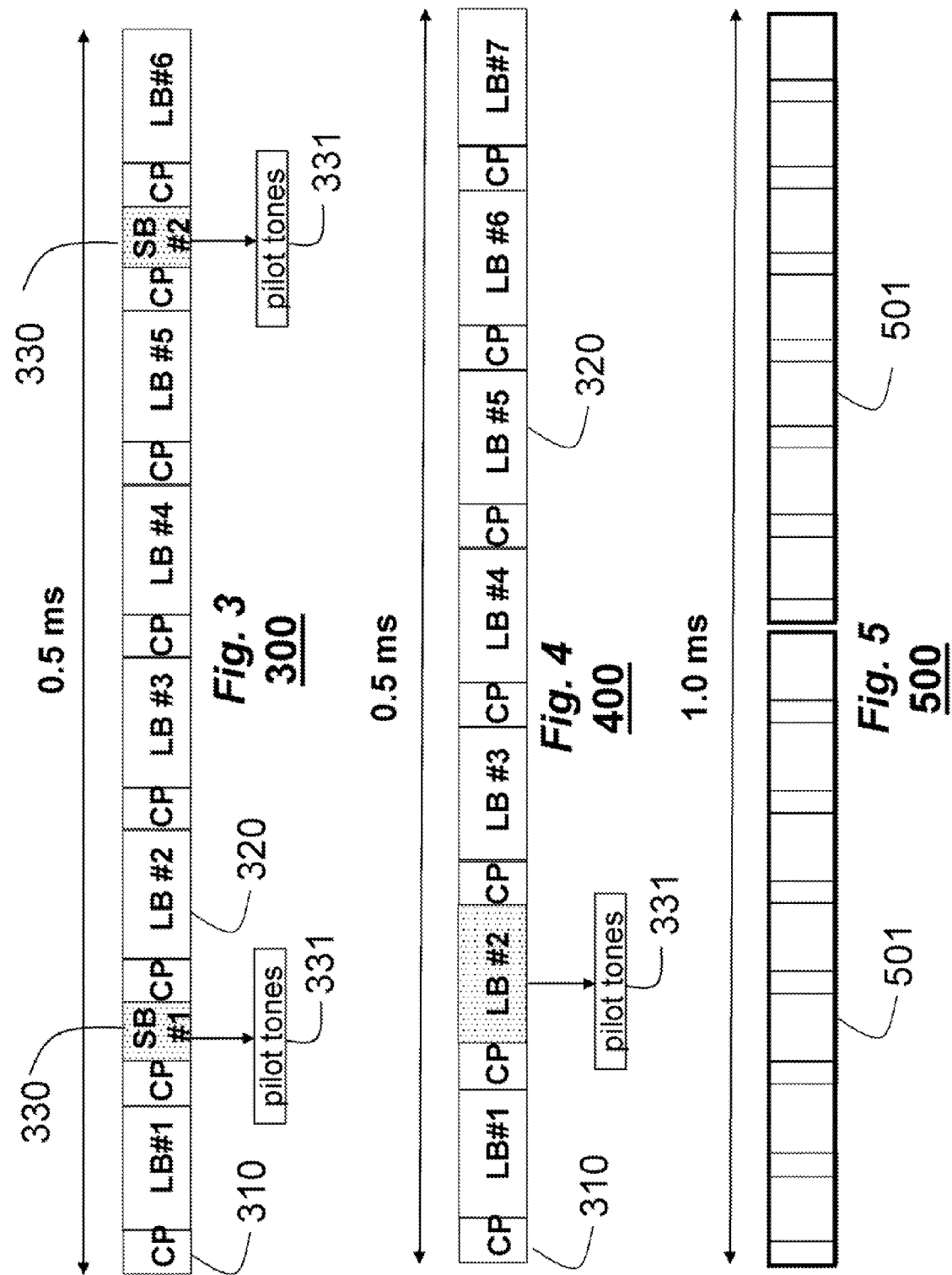

METHOD AND SYSTEM FOR SWITCHING ANTENNAS DURING TRANSMISSION TIME INTERVALS IN OFDMA SYSTEMS

RELATED APPLICATIONS

This application is related to U.S. application Ser. No. 11/620,089 entitled "Method and System for Antenna Selection in Wireless Networks" co-filed herewith by Mehta et al., and incorporated herein by reference.

FIELD OF THE INVENTION

This invention relates generally to OFDM wireless networks, and more particularly to switching antennas in such networks.

BACKGROUND OF THE INVENTION

The $3^{rd}$ generation partnership project (3GPP) specification for global system for mobile communication (GSM) includes the specifications for GPRS, EDGE, and W-CDMA. Current working assumption for the physical layer multiple access scheme is OFDMA for the downlink, and single carrier FDMA (SC-FDMA) for the uplink. The subcarrier spacing in the OFDM downlink is 15 kHz and there are a maximum of 2048 subcarriers available. Supported modulation formats on the downlink data channels are QPSK, 16QAM, and 64QAM.

According to the 3GPP long term evolution (LTE), the transmission is divided in time into time slots of duration 0.5 ms, and a subframe of duration of 1.0 ms. A radio frame is 10 ms long. The basic transmission unit is a transmit time interval (TTI). A TTI can be one or more time slots.

During each time slot, multiple OFDM symbols are transmitted. Each time slot can include pilot tones and user data. The pilot tones enable channel estimation at a receiver for data demodulation, antenna selection, and radio resource allocation. Typically, the receiver sends back the channel estimates to the transmitter, and the transmitter can then select antennas according to the best channels. In a dynamic environment, channel estimation and antenna selection is performed periodically to accommodate varying channel conditions and mobile stations.

Each OFDM symbol starts with a cyclic prefix (CP). The CP minimizes inter-symbol interference (ISI) in the presence of multipath interference in a wireless channel. When the first CP-length duration of the received signal is discarded, the resultant signal turns out to be a circular convolution of the data with the channel. This is true as long as the multipath dispersion in the channel is less than the CP duration. Therefore, interference between the subcarriers, i.e., inter-carrier interference (ICI), does not exist.

OFDMA Structure in LTE

The basic uplink transmission scheme is described in 3GPP TR 25.814, v1.2.2 "Physical Layer Aspects for Evolved UTRA," Release 7, March 2006, incorporated herein by reference. That scheme is a single-carrier transmission (SC-FDMA) with cyclic prefix to achieve uplink inter-user orthogonally to enable efficient frequency-domain equalization at the receiver. This allows for a relatively high degree of commonality with the downlink OFDM scheme, and the same parameters, e.g., clock frequency, can be reused.

Antenna Selection

The 3GPP systems use multiple-input, multiple-output communications (MIMO). That is, the transmitters and receivers can use an array of antennas to increase spatial.

While MIMO systems perform well, they also increase the hardware and signal processing complexity, power consumption, and component size in the transmitter and the receiver. One of the main reasons for the increase in complexity is that each receive antenna element requires a dedicated radio frequency (RF) chain that comprises a low noise amplifier, a frequency down-converter, and an analog to digital converter; and each transmit antenna element requires an RF chain that comprises a digital to analog converter, a frequency up-converter, and a power amplifier. Moreover, processing the signals received in spatial multiplexing schemes or with space-time trellis codes requires sophisticated receivers whose complexity increases, sometimes exponentially, with the number of transmit and receive antenna elements.

Antenna selection addresses some of the complexity drawbacks associated with MIMO systems because antenna elements are typically cheap, and the RF chains are considerably more expensive. Antenna selection reduces the hardware complexity of transmitters and receivers by using fewer RF chains than the number of antenna elements. In antenna selection, a subset of the available antenna elements is adaptively selected by a switch, and only signals from the selected subset of antennas are processed further by the available RF chains, N. B. Mehta and A. F. Molisch, "Antenna selection in MIMO systems," in "MIMO System Technology for Wireless Communications," (G. Tsulos, ed.), ch. 6, CRC Press, 2006, A. F. Molisch and M. Z. Win, "MIMO systems with antenna selection," IEEE Microwave Mag., pp. 46-56, March 2004, S. Sanayei and A. Nosratinia, "Antenna selection in MIMO systems," IEEE Commun. Mag., pp. 68-73, October 2004, R1-050944, "Antenna selection techniques," Mitsubishi Electric, 3GPP RANI#42, 2005, R1-051398, "Transmit antenna selection techniques for uplink E-UTRA," Institute for Infocomm Research, Mitsubishi Electric, NTT DoCoMo, all incorporated herein by reference.

Being able to switch antennas within a TTI could be advantageous because this would enable transmission of pilot tones or data from many or all of the available antennas to increase spatial diversity. That is, signals transmitted from different antennas reach a receiver through different wireless channels at any time. This improves the robustness of transmission schemes to fading since the odds of all the wireless channels being in a fading dip are considerably lower.

SUMMARY OF THE INVENTION

A method and system switches antennas in an orthogonal frequency division multiplexed access (OFDMA) wireless communication system while transmitting symbols. Each symbol includes a cyclic prefix and a block of data signals. The symbols are transmitted during a first portion of a transmission time interval (TTI), from a first antenna. Then, the RF chain is switched to a second antenna to transmit the symbols, and in which the switching is performed substantially between transmitting two consecutive transmitted symbols.

BRIEF DESCRIPTION OF THE DRAWINGS

FIGS. 2A-2B are block diagrams of subcarrier mapping used by an embodiment of the invention;

FIGS. 3-5 are block diagrams of transmission time intervals used by embodiments of the invention;

DETAILED DESCRIPTION OF THE PREFERRED EMBODIMENTS

The embodiments of the invention provide for a method and system for switching antennas during a transmission time interval (TTI) while transmitting OFDMA symbols. This requires a careful design, because a finite amount of time is required to switch between the antennas.

Figure 1A:
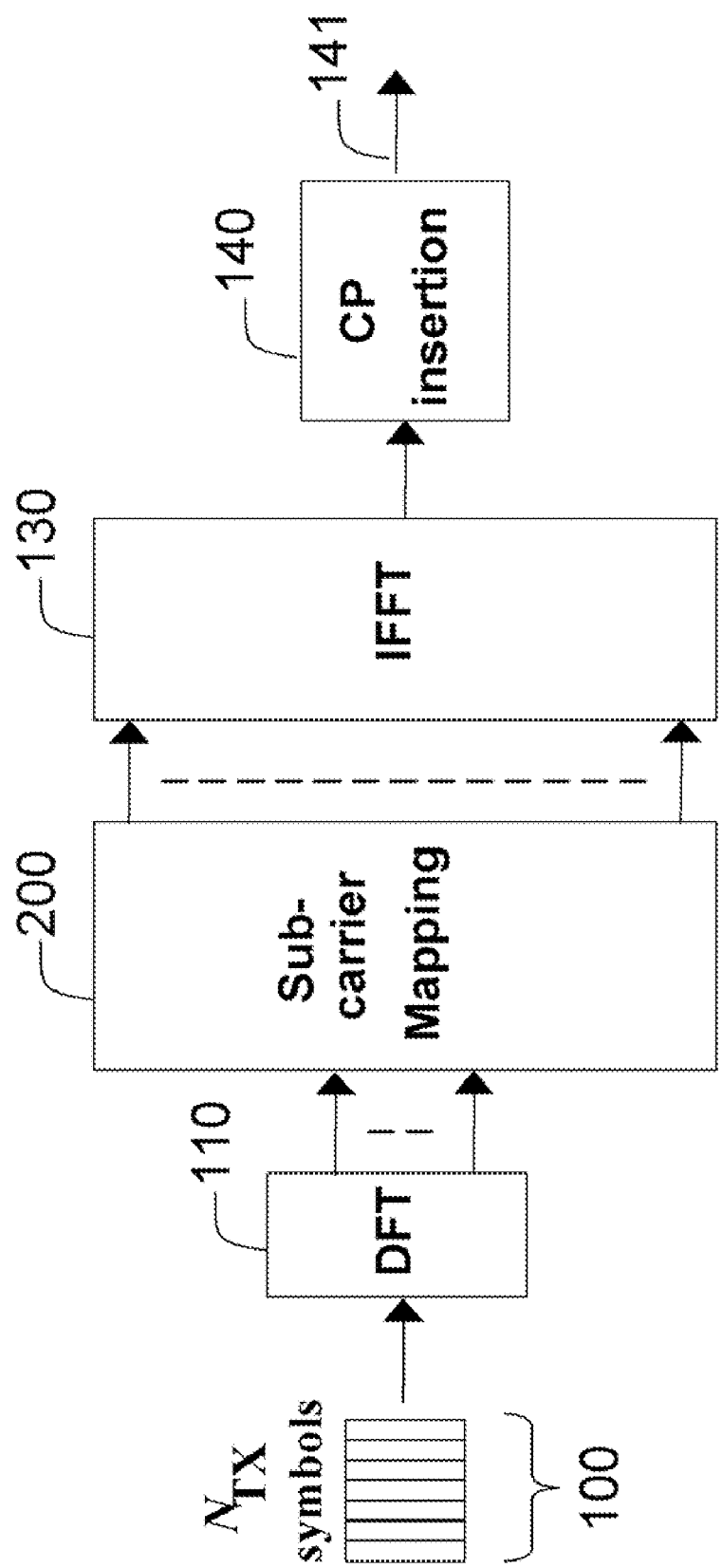
FIG. 1A is a block diagram of a transmitter used by an embodiment of the invention.

FIG. 1A shows the basic structure of a transmitter that can be used by the invention. Symbols $N_{TX}$ 100 are to be encoded at a rate R. A discrete Fourier transform (DFT) 110 is applied to the input symbols 100. This is followed by sub-carrier mapping 120, and an inverse fast Fourier transform (IFFT) 130, followed by cyclic prefix (CP) insertion 140 before the symbols are modulated and transmitted on a channel 141.

Figure 1B:
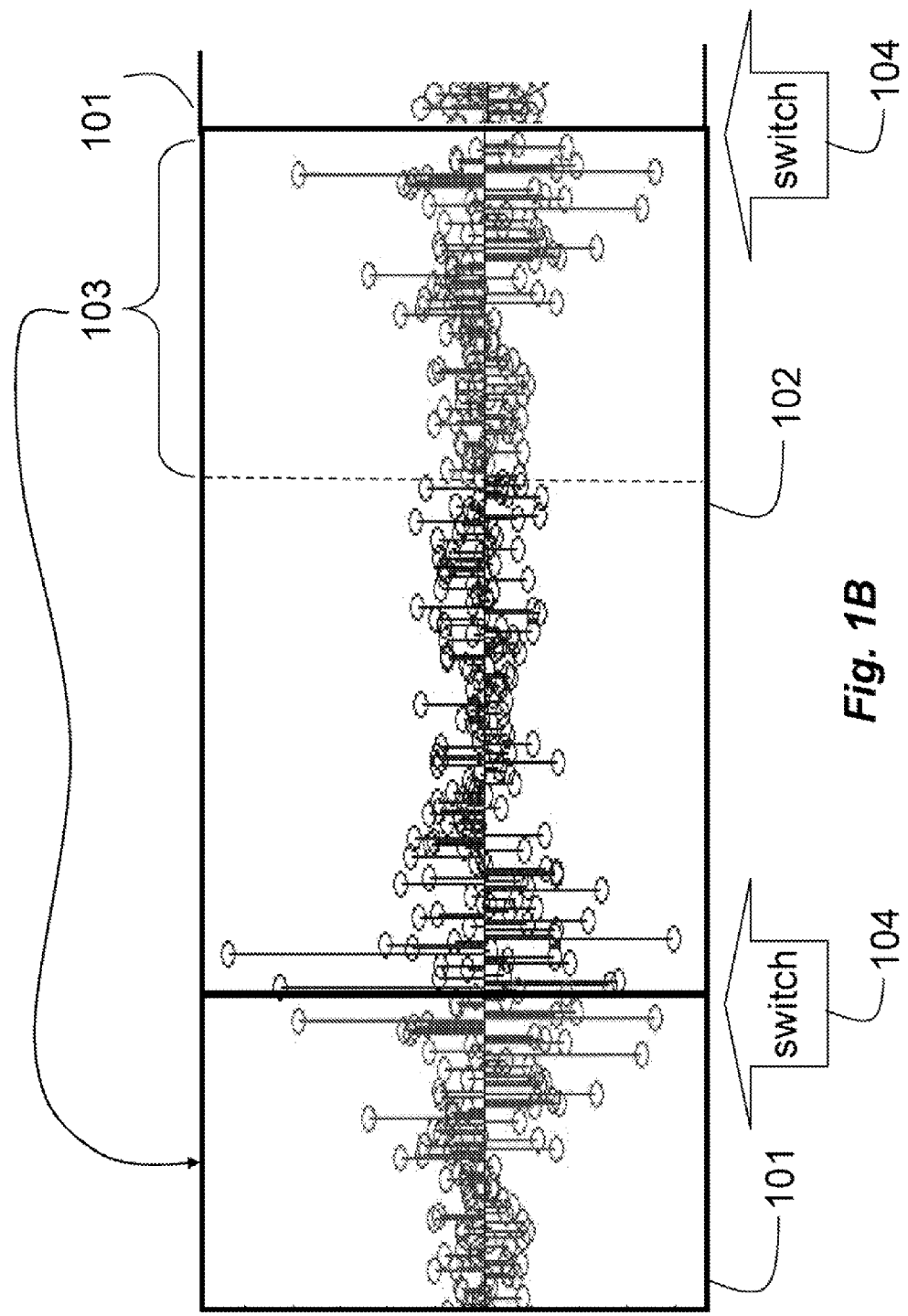
FIG. 1B is a block diagram of a basic structure of an OFDMA symbol used for the switching according to the embodiment of the invention.

FIG. 1B shows the basic structure of an OFDMA symbol 100 used for the switching according to the invention. The symbol 100 includes a cyclic prefix 101 and a block of data signals 102. The cyclic prefix 101 is a repeat of the end 103 of the symbol inserted at the beginning of the symbol 100. The purpose of the CP is to allow multipath to settle before the block of data signals 102 arrives at the receiver. Typically, the length of the cyclic prefix is equal to the guard interval. The block can be short or long. The short blocks are used for data modulation (DM) signal and antenna selection (AS) signals. The signals in the short blocks are frequently referred to as "reference signals" or "pilot tones." The long blocks are used for control and data signals.

The time required to switch antennas can be measured in terms of nanoseconds, e.g., 10 to 100 nanoseconds depending on the exact implementation. This is orders of magnitude shorter than the length of the symbol, e.g., 10 ms. Therefore, in one embodiment of the invention, the antennas are switched 104 substantially between the symbols. That is, the switching can take place at the end of the block of the previous symbol, or at the beginning of the CP of the next symbol.

The sub-carrier mapping 120 determines which part of the spectrum (subcarrier) is used for transmission. Between each DFT output sample, L−1 zeros are inserted as shown in FIGS. 2A-2B. A mapping with L=1, as shown in FIG. 2A corresponds to localized transmissions, i.e., transmissions where the DFT outputs are mapped to consecutive sub-carriers. With L>1 as shown in FIG. 2B, distributed transmissions result, which are considered as a complement to localized transmissions for additional frequency diversity.

FIG. 3 shows a TTI with one time slot 300 considered for 3GPP LTE. The TTI has duration of 0.5 ms. The one time slot includes cyclic prefixes (CP) 310, long blocks (LB) 320, short blocks (SB) 330. The symbols in the short blocks can be used to transmit pilot tones 331. The long blocks 320 are used to transmit information symbols (data). Thus, the TTI includes six LBs and two SBs.

FIG. 4 shows another 0.5 ms TTI 400 considered for 3GPP LTE. In this case, all the OFDM symbols are of the same length. One or more of the LBs 320 in the time slot are used to transmit pilot tones 331, while the other LBS are used to transmit data. In effect, this TTI has of seven LBs 320.

FIG. 5 shows a TTI 500 with multiple time slots. For example, the TTI is 1.0 ms and includes two time slots. The time slots can be as in FIGS. 3 and 4.

In one embodiment of the invention, the antennas switching is performed in the SB or LB that contains pilot tones. In this case, the accuracy of the channel estimation may be reduced. In another embodiment, the switching is performed during a long block that carries data. This may lead to loss of data, which is partly compensated by the channel coding over the TTI.

The switching can be performed during the CP that precedes or follows the SB or LB, or during the SB or LB itself. In either case, there can be a decrease in the orthogonality among the subcarriers of the SB or LB and this cause ICI.

In the uplink channel, all the signals from mobile stations (users) arrive concurrently at the base station. Therefore, all signals are processed together. Before demodulation, the base station cannot distinguish which packet comes from which user. Therefore, any loss of orthogonality in the signal from one user can cause ICI for other the users. The interference increases as the number of samples lost during switching increases.

Open-Loop Antenna Switching

In open-loop antenna switching according to one embodiment of the invention, the all antennas at the transmitter switch within a TTI in a pre-determined manner. The switching is not adjusted dynamically based on the instantaneous channel states. It is preferable to switch the antennas only one time during the TTI in order to give each antenna an equal amount of transmission time.

Figure 6:
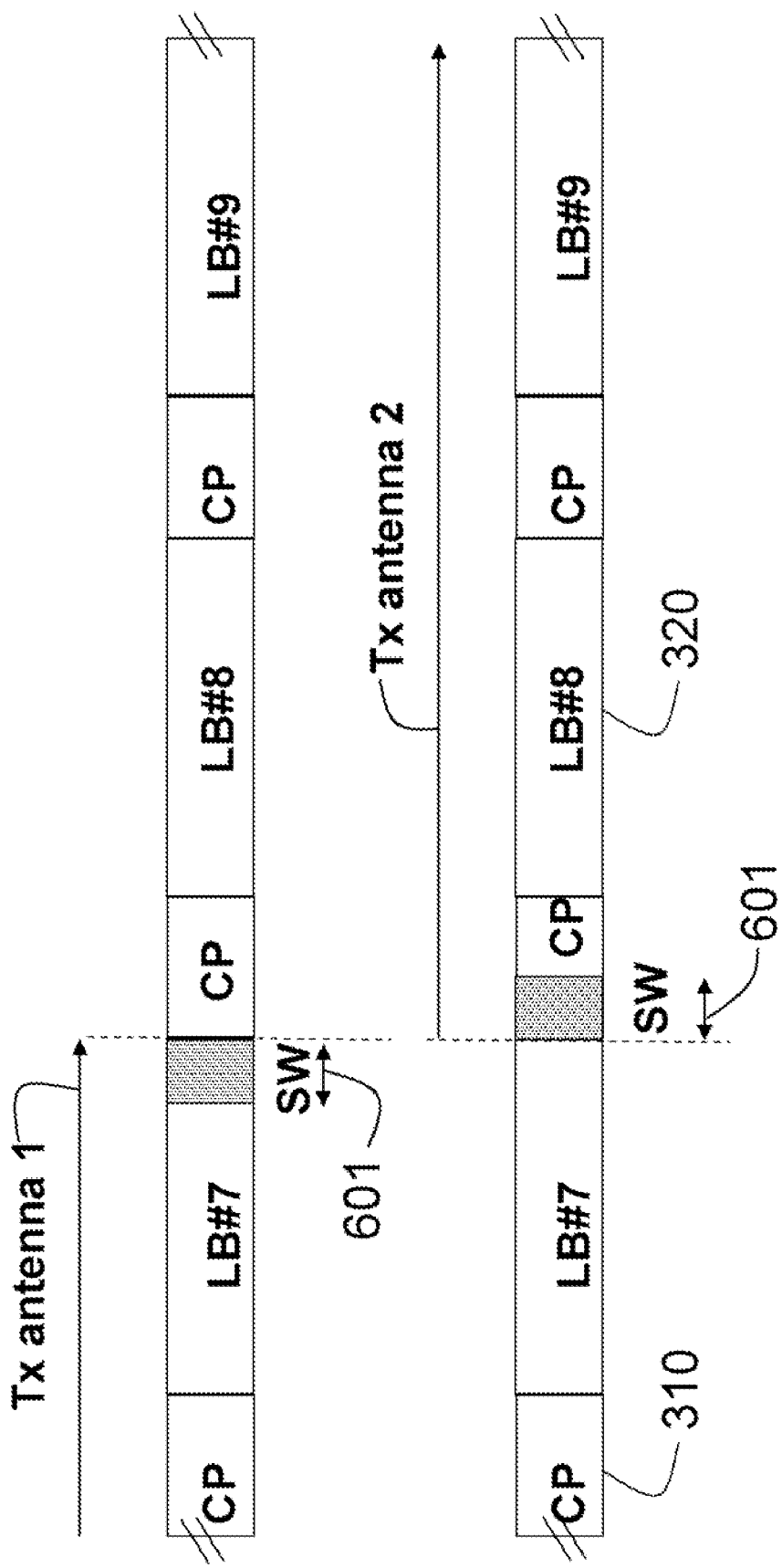
FIG. 6 is a block diagram of antenna switching according to embodiments of the invention.

As shown in FIG. 6, the time for switching (SW) 601 can be taken from either the CP of an LB or in the data part of the LB that precedes the CP or from portions of both. FIG. 6 shows the switching for Tx transmit antenna 1, and Tx antenna 2.

Closed-Loop Antenna Switching

Figure 7:
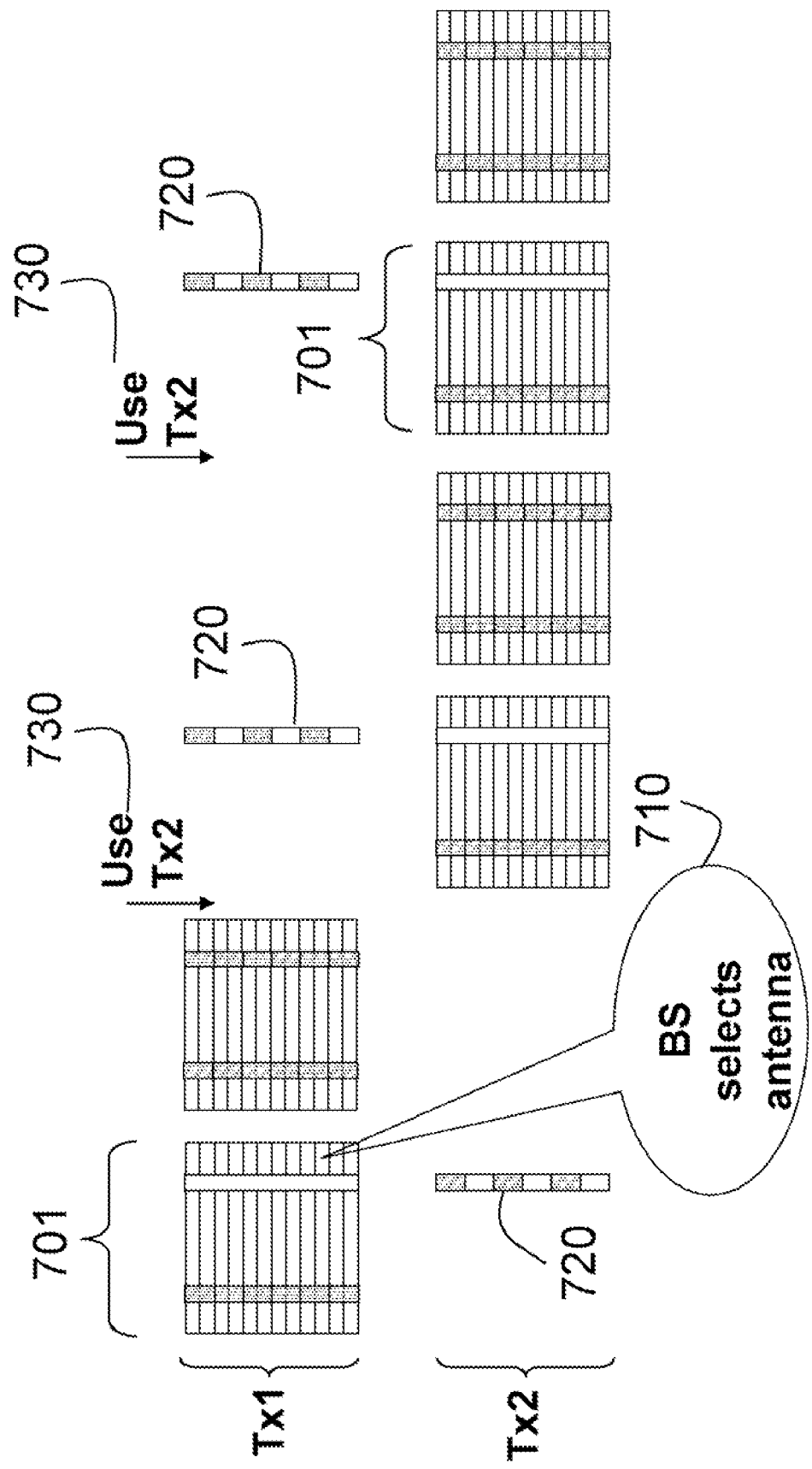
FIG. 7 is a block diagram of antenna selection and antenna switching according to embodiments of the invention.

In the closed-loop switching scheme, as shown for two Tx antennas Tx1 and Tx2 in FIG. 7, the entire TTI 701 is transmitted by the selected antenna, which ideally has the best instantaneous channel gain of the available antennas. In order to allow the base station to determine the channel state of the unselected antenna and to select 710 the best antenna, the unselected antenna periodically transmits one of the LBs or SBs that contain pilot tones 720, every few TTIs. As shown in FIG. 7, there is a delay before the selected antenna, e.g., Tx2 is used 730. In this example, the Tx2 is reselected. Thus, the base station can then estimate the channel state for both two antennas, while transmitting data, and determine the best antenna to be used for subsequent transmissions.

Figure 8:
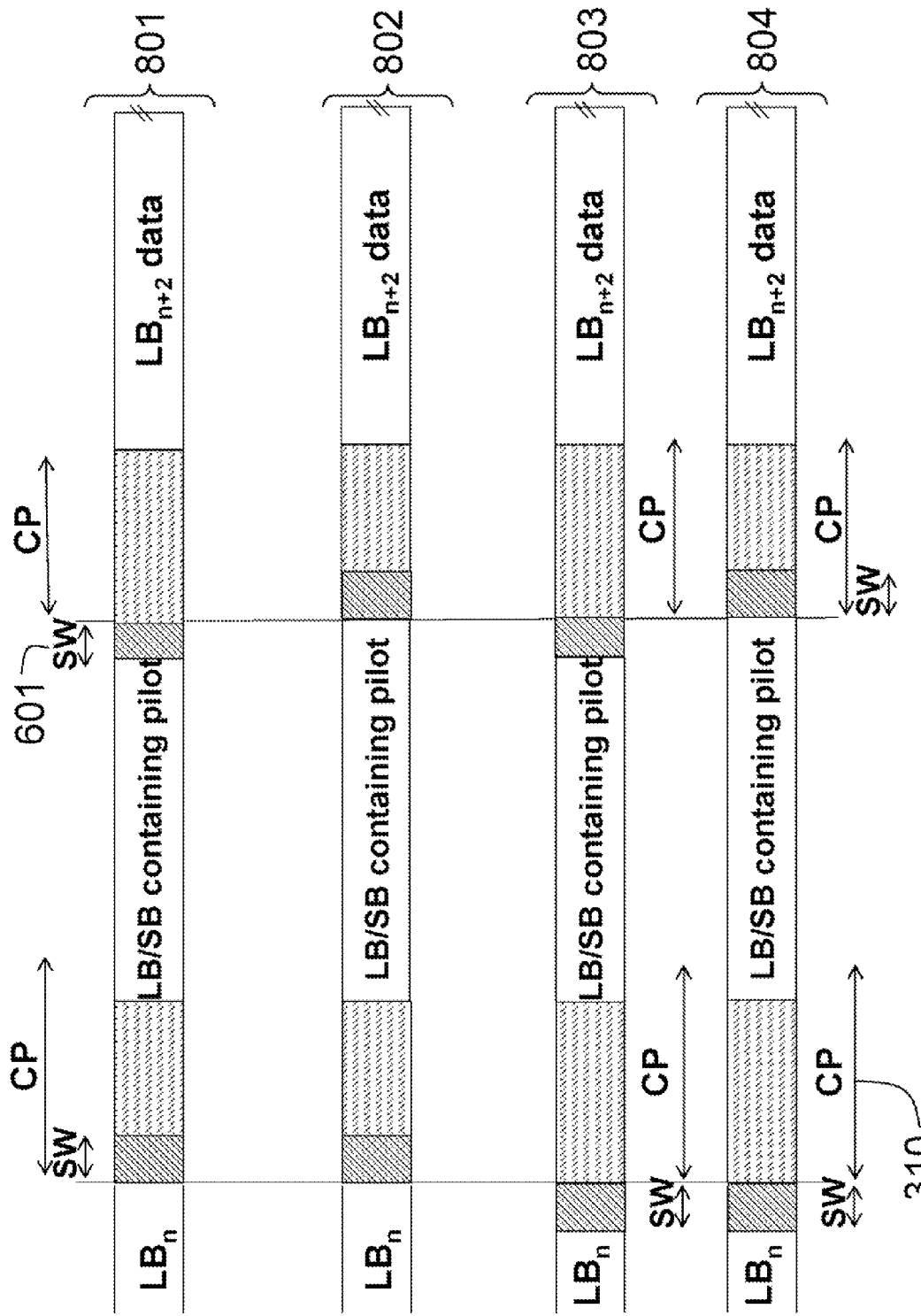
FIG. 8 is a block diagram of four antenna switching schemes according to embodiments of the invention.

FIG. 8 shows four ways that antennas can be switched. Switching entirely within an LB/SB used to send pilot tones, and use CP and LB or SB data part for switching—801. Switching using CP of LB/SB used to send pilot tones and CP of adjacent LB—802. Switching using CP of LB/SB used to send pilot tones and CP of adjacent LB—803. Switching using CP of adjacent LBs and not using the CP of the LB/SB used to send pilot tones—804.

Of the four methods described above, the first method, in which the LB/SB that contains pilot tones for transmission, is used for the switching times leads to the least loss in performance as data LBs are not affected.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for switching antennas in an orthogonal frequency division multiplexed access (OFDMA) wireless communication system while transmitting symbols, each symbol including a cyclic prefix and a block of data signals, comprising:

transmitting the symbols during a first portion of a transmission time interval (TTI), from a first antenna connected to an RF chain, in which the block of data signals includes a pilot tone, and in which the pilot tone is used for channel quality estimation for frequency domain scheduling; and switching, during a second portion of the TTI, the RF chain to a second antenna to transmit the symbols, in which the switching is performed substantially between transmitting two consecutive symbols.

2. The method of claim 1, in which the switching is performed at an end of the block of data signals of a previous symbol.

3. The method of claim 1, in which the switching is performed at a beginning of the cyclic prefix of a next symbol.

4. The method of claim 1, in which switching is performed substantially between two consecutive TTIs.

5. The method of claim 1, in which the block of data signals is short.

6. The method of claim 1, in which the block of data signals is long.

7. The method of claim 1, in which the block of data signals includes user data.

8. The method of claim 1, further comprising:
   estimating a channel for the first antenna and the second antenna; and
   selecting a best antenna from the first and second antenna based on the channel estimation to transmit subsequent symbols.

9. The method of claim 1, further comprising:
   transmitting periodically the pilot tones by the first antenna and the second antenna; and
   estimating a channel for the first antenna and the second antenna using the pilot tones.

10. A system for switching antennas in an orthogonal frequency division multiplexed access (OFDMA) wireless communication system while transmitting symbols, each symbol including a cyclic prefix and a block of data signals, comprising:

means for transmitting the symbols during a first portion of a transmission time interval (TTI), from a first antenna, in which the block of data signals includes a pilot tone, and in which the pilot tone is used for channel quality estimation for frequency domain scheduling; and means for switching, during a second portion of the TTI, the RF chain to a second antenna to transmit the symbols, in which the switching is performed substantially between transmitting two consecutive transmitted symbols.

* * * * *